G. W. LONG & E. OTIDYS.
COTTON MARKER FOR BALES.
APPLICATION FILED FEB. 5, 1908.
936,918.
Patented Oct. 12, 1909.
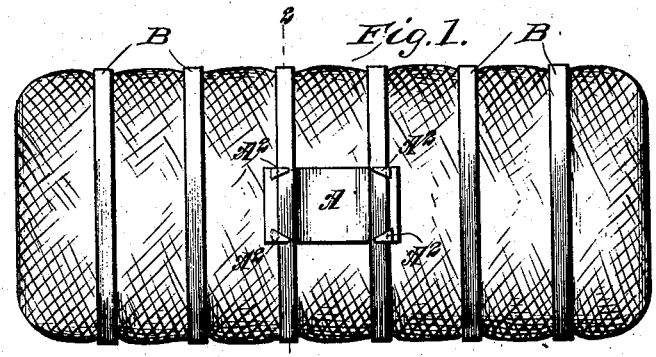
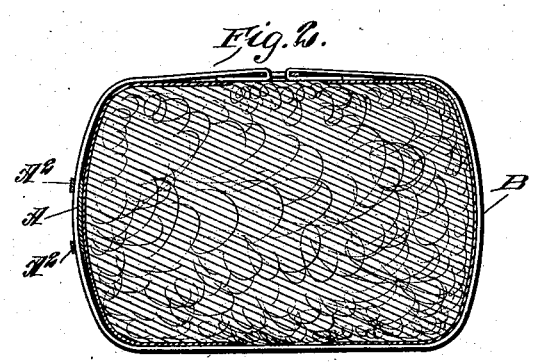
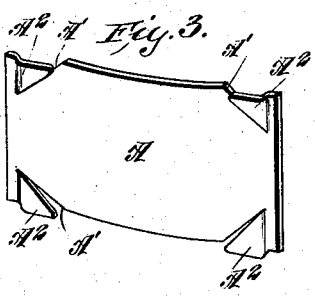
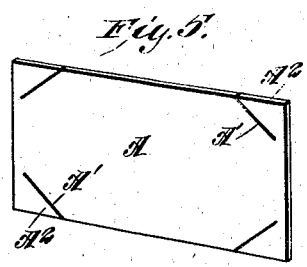
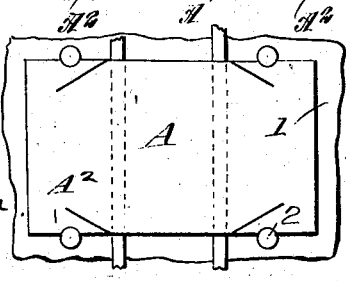
WITNESSES
INVENTORS
GEORGE W. LONG
EVANGELO OTIDYS
BY
ATTORNEYS

UNITED STATES PATENT OFFICE.

GEORGE W. LONG AND EVANGELO OTIDYS, OF LINDSAY, OKLAHOMA.

COTTON-MARKER FOR BALES.

936,918.

Specification of Letters Patent. Patented Oct. 12, 1909.

Application filed February 5, 1908. Serial No. 414,363.

*To all whom it may concern:*

Be it known that we, GEORGE W. LONG and EVANGELO OTIDYS, citizens of the United States, and residents of Lindsay, in the county of Garvin and State of Oklahoma, have invented certain new and useful Improvements in Cotton-Markers for Bales, of which the following is a specification.

This invention is an improvement in cotton markers for use on bales of cotton whereby the bale when being tied out will operate to permanently bind the marker to the bale by the ties, which hold the bale in compression; and the invention consists in certain novel constructions and combinations of parts hereinafter described and claimed.

In the drawing Figure 1 is an elevation of a bale provided with our improvements. Fig. 2 is a cross-section thereof on about line 2—2 of Fig. 1. Fig. 3 is a detail perspective view, and Fig. 4 an edge view of the marker plate, and Fig. 5 is a detail perspective view of the plate before being applied to the bale, and Fig. 6 is a diagrammatic view illustrating the manner of applying the ties to the marker preliminary to the application of the ties and marker to the bale.

In carrying out the invention we employ a marker plate A of suitable thin metal which can be bent by the ties when the bale is being tied out, and this plate contains the desired marks or inscriptions, the letters, numerals or symbols being inscribed on the plate in any desired manner. This plate when applied rests flat against the bale and the ties B cross the said plate, and enter slits A' in the longitudinal edges of the plate and preferably diagonal thereto, as shown, forming tongues $A^2$, which overlie the ties B and aid in securing the marker plate in connection with the said ties. The slits A' it will be noticed open in opposite directions so that the two ties crossing the marker plate near the ends of the latter bear below the tongues and within their respective slits and secure the marker plate firmly in place when the bale is compressed.

It will be noticed that in operation the expansion of the cotton forces the bands or ties B into the slits A' of the marker plate and the tongues formed by said slits prevent the marker from being removed from the bale except when the bands are released. In operation the tongues formed by the slits in the marker plate are pulled out by flush nail heads on follower block of press for reception of ties or bands.

In practice, see Fig. 6, the nail heads 2 are so disposed in the follower block 1 as to overlie the tongues $A^2$, and the ties are passed below the plate A adjacent to the tongues $A^2$ so that when the ties are fastened and the bale expands, the nail heads will hold the tongues while the body portion of the plate is lifted so that the ties will automatically pass below the tongues $A^2$ as the latter escape from the nail heads. In the said operation it should be understood that in the compression of the bale, or while it is being tied out, the marker plate lies perfectly flat against the follower block due to the pressure thereon until the ties or bands are fastened. Then the pressure is released and the expansion outside of the bands takes place as the block is lowering. At this time the nail heads in the block pull out the tongues on the marker as the bands begin to tighten thus permitting the bands to naturally enter the slits and pass below the tongues. In this operation the expansion is not great in line with the ties, but takes place between the ties so the latter will lift the plate or marker from the block, and in doing so, have to pull the plate loose from the nail heads, lifting the tongues to permit the passage of the ties beneath them.

We claim—

1. A bale and ties thereon combined with a marker plate underlying two of the ties and having in its opposite longitudinal edges near its ends slits inclined to the length of the plate and opening away from the adjacent ends of the plate and forming tongues overlying the ties, substantially as set forth.

2. A marker plate for bales consisting of a thin bendable plate having in its side edges near its ends inclined slits opening in opposite directions from the adjacent ends of the plate and adapted to receive bale ties, substantially as set forth.

3. A marker plate for bales having in its edges inclined slits forming tongues united with the plate adjacent to the respective ends thereof and projecting at their free ends toward the intermediate portion of the plate, substantially as set forth.

4. A marker plate for bales having at its several corners tongues whose free ends extend toward the intermediate portion of the plate and are adapted to overlie the bale ties in the practical application of the device, substantially as set forth.

GEO. W. LONG.
EVANGELO OTIDYS.

Witnesses:
G. W. FRENCH,
T. D. WAGNER.